United States Patent
La Porta et al.

[11] Patent Number: 5,434,852
[45] Date of Patent: Jul. 18, 1995

[54] DISTRIBUTED PROCESSING ARCHITECHTURE FOR CONTROL OF BROADBAND AND NARROWBAND COMMUNICATIONS NETWORKS

[75] Inventors: Thomas F. La Porta, Thornwood, N.Y.; Malathi Veeraraghavan, Atlantic Heights, N.J.

[73] Assignee: AT&T Corp., Murray Hill, N.J.

[21] Appl. No.: 298,287

[22] Filed: Aug. 31, 1994

Related U.S. Application Data

[63] Continuation of Ser. No. 82,656, Jun. 25, 1993, abandoned.

[51] Int. Cl.$^6$ .......................... H04J 3/12; H04L 12/16
[52] U.S. Cl. ........................ 370/58.2; 370/62; 370/68.1; 370/110.1; 379/157; 379/165
[58] Field of Search ............... 370/58.1, 58.2, 58.3, 370/60, 60.1, 62, 68.1, 110.1; 379/94, 157, 158, 165, 202

[56] References Cited

U.S. PATENT DOCUMENTS

| | | | |
|---|---|---|---|
| 4,896,319 | 1/1990 | Lidinsky et al. | 370/60 |
| 5,036,318 | 7/1991 | Bachhuber et al. | 370/85.1 X |
| 5,218,602 | 6/1993 | Grant et al. | 370/58.2 |
| 5,291,479 | 3/1994 | Vaziri et al. | 370/58.2 |

OTHER PUBLICATIONS

C. Woodworth, M. J. Karol, R. D. Gitlin, "A Flexible Broadband Packet Switch for a Multimedia INtegrated Network", Proceedings International Conference on Communications, Jun. 23–26, 1991, Denver, pp. 3.2.1–3.2.8.

I. Faynberg, L. R. Gabuzda, M. P. Kaplan, M. V. Kolipakum, W. J. Rowe, A. L. Waxman, "The Support of Network Interworking and Distributed Context Switching in the IN Service Data Function Model", 2nd International Conference on Intelligence in Networks, France, Mar., 1992, pp. 11–16.

S. Minzer, "A Signaling Protocol for Complex Multimedia Services", IEEE Journal on Selected Areas in Communications, vol. 9, No. 9, Dec. 1991. Pp. 1383–1394.

M. Fukazawa, M. Wakamoto and M. W. Kim, "Intelligent Network Call Model for Broadband ISDN", ICC 1991, pp. 964–968.

*Primary Examiner*—Melvin Marcelo
*Attorney, Agent, or Firm*—John A. Caccuro

[57] ABSTRACT

A distributed, server-based communications network architecture delivers broadband and narrowband communications services. In the architecture, various traditional call processing functions, such as switching fabric or channel control, call control, and connection control are separated into distinct application processes with clearly defined interfaces for communications between these application processes. Those distinct application processes may be implemented in separate physical or logically partitioned nodes. The well-defined interfaces allow communications among: a) physical or logically partitioned nodes within a network and b) physical or logically partitioned nodes of other networks.

12 Claims, 5 Drawing Sheets

FIG. 1

| OBJECT | IDENTIFYING ATTRIBUTES | NON-IDENTIFYING ATTRIBUTES |
|---|---|---|
| CALL | CALL REFERENCE VALUE | SERVER IDENTIFIERS(R)<br>USER IDENTIFIERS(R) |
| CONNECTION | VIRTUAL CHANNEL CONNECTION IDENTIFIER | CONNECTION PERFORMANCE ATTRIBUTES<br>AAL PROTOCOL TYPE(BEARER CAPABILITY)<br>DIRECTIONALITY AND SYMMETRY<br>USER IDENTIFIERS(R)<br>SWITCH IDENTIFIERS(R)<br>CHANNEL IDENTIFIERS(R) |
| CHANNEL | USER IDENTIFIER<br>SWITCH IDENTIFIER<br>TWO PORT NUMBERS<br>VPCI/VCI | ATM LAYER BEARER CAPABILITY<br>CHANNEL PERFORMANCE ATTRIBUTES |
| ROUTE | ROUTE NUMBER | PERFORMANCE ATTRIBUTES<br>BANDWIDTH<br>DIRECTIONALITY AND SYMMETRY<br>USER IDENTIFIERS(R)<br>SWITCH IDENTIFIERS(R)<br>CHANNEL IDENTIFIERS(R) |
| CALL CONNECTION MAPPING | CRV<br>VCCI | |
| VCI TRANSLATION TABLE ENTRY | CHANNEL IDENTIFIER<br>CHANNEL IDENTIFIER | VCCI(R) |
| USER-CALL-INTERACTION<br>(SERVER-CALL-INTERACTION) | CRV<br>USER IDENTIFIER<br>(SERVER IDENTIFIER) | VCCIs<br>CONNECTION ATTRIBUTES<br>SERVICE IDENTIFIERS<br>SERVICE-SPECIFIC PARAMETERS<br>USER IDENTIFIERS<br>USER-SPECIFIC PARAMETERS<br>DIVERGENCE FLAG<br>SYNCHRONIZATION FLAG<br>NEGOTIATION OPTIONS<br>MODIFICATION MANDATORY OR OPTIONAL<br>ADD USER FLAG<br>DELETE USER FLAG<br>CHANGE QOS OR BW FLAG<br>SUCCESS FLAG<br>FAILURE FLAG |

DISTRIBUTED PROCESSING ARCHITECHTURE FOR CONTROL OF BROADBAND AND NARROWBAND COMMUNICATIONS NETWORKS

This application is a continuation of Ser. No. 08/082,696, filed on Jun. 25, 1993, abandoned.

TECHNICAL FIELD

This invention relates to communication systems. More specifically, this invention relates to communications systems supporting broadband and narrowband voice, data and video communication services.

BACKGROUND

Over the years, advances in communications networks architecture have allowed new telecommunications services to be offered by communications carriers. For example, the introduction of a separate signaling subnetwork within a communications network paved the way for the introduction of services, such as software-defined network and freephone services. Likewise, communications architectures have changed in response to needs of the marketplace for particular telecommunications services. For example, persistent requests for customized services from subscribers were the driving force behind the creation of a service-independent capabilities-based architecture called "Intelligent Network" (IN) architecture. The IN architecture represents an evolutionary step from the traditional communications architecture. More specifically, changes were introduced in the traditional architecture to meet the requirements of the IN-based services. Of particular importance in the IN-architecture is the separation of the service control functions from the transport control functions. However, one of the drawbacks of the IN architecture is that all network nodes must be capable of, and may be required to perform, loosely coupled functions aimed at different objectives i.e., there is a bundling of distinct control functions, such as call control, connection control and channel control. As a result, introduction of new services associated with one of these functions require changes to software that effects all of these functions and that is loaded in these network nodes.

With the impending standardization of Broadband Integrated Services Digital Network (B-ISDN), an emerging class of new services is anticipated to be offered by carriers and third party vendors. Those services include high bandwidth multimedia, multipoint applications, interactive video services, bulk data retrieval and archiving, messaging and distributional services. Associated with these new services are switching, connection, and signaling requirements whose complexities are unparalleled in today's communications networks. Requirements that have been identified include user/server negotiation requirements, dynamic modification of active connections, recognition of need for special resources (such as protocol converters and bridges), to name a few.

From the foregoing, it is clear that today's communications network architectures are ill-suited for those emerging requirements. Thus, a new communications architecture is needed to allow communications networks to support the emerging B-ISDN services while at the same time accommodating traditional and IN-based telephony services. Unlike the evolutionary adaptation of the traditional communications architecture to meet the requirements of IN-based services, the complexity of call and connection controls in a B-ISDN environment requires a paradigm shift in communications network architectures to meet the performance-demanding requirements of B-ISDN services.

SUMMARY

The present invention is directed to a distributed, server-based communications network architecture in which various traditional call processing functions, such as switching fabric or channel control, call control, connection control are separated into distinct application processes with clearly defined interfaces for communications between these application processes. Those distinct application processes may be implemented in separate physical or logically partitioned nodes. The well-defined interfaces allow communications among physical or logically partitioned nodes within a network, physical or logically partitioned nodes of compatible networks, and customer premises equipment connected to a compatible network.

In a preferred embodiment of the invention, object-oriented analytical tools are used to derive four types of models to identify the functions associated with call processing in a B-ISDN, N-ISDN and traditional communications networks. These models are: an Information Model (IM), State Models (SM), an Object Communications Model (OCM), and Process Models (PM). An Information Model (IM) is similar to an "Entity-Relationship" diagram in which, all data associated with a physical or logical entity are grouped into "objects". Included in the data for physical objects, such as CPE (also called "users"), switches, and adjunct processors (also called "servers"), are the respective attributes of these objects, such as, identifiers and object-specific parameters. For intercommunications between the physical objects, the model also identifies communications objects, such as call, connection and channel, with their respective attributes and relationships to the physical objects and other communications objects (one-to-many, many-to-many).

In the State Models (SM), different states of an object instance are defined. When an object instance enters a state (the call object in the "call being set up" state, for example), it performs certain actions (digit translation in a server, for example). In the course of performing those actions, the object generates events that may impact its own state model and cause state transitions in other object instances, called "cross-object events". The cross-object events for all objects in the IM are identified in the Object Communication Model (OCM). The details of data flow in an Action Process are provided in the Process Models (PMs).

Based on the four models, a multiserver-based communications network architecture is derived. The architecture is characterized by a functional separation of the operations to be performed by the servers. For example, existing call processing functions may be allocated to individual servers as follows: fabric control functionality in one or more channel servers, connection control functions in one or more connection servers, feature management capabilities in one or more call servers and service control functions in service-specific servers, each one of these service-specific servers being associated with a particular type of communications service. Assignment of particular tasks or operations to a particular server reflects the close relationship between objects related to particular sub-functions, as indicated by the number of cross-object events associated with those tasks or operations. For example, the call-connection-mapping, the route and the connection objects are managed in one server. Details of a suite of protocols defined to enable communications between these application processes are provided in the commonly assigned co-pending United States patent application Ser. No. 08/082,654 entitled "Communications Signaling Protocols".

BRIEF DESCRIPTION OF THE DRAWING

FIG. 1 is a table that lists objects and their associated attributes for B-ISDN communications;

DETAILED DESCRIPTION

FIG. 1 is a table that lists objects and their associated attributes for B-ISDN communications. The table of FIG. 1 is derived from the use of an analytical tool known in the an as "Object Oriented Analysis" (OOA). OOA advocates the building of four types of models: Information Model (IM), State Models (SM), Object Communication Model (OCM), and Process Models (PM), to ascertain the characteristics of entities and the relationship between those entities that are called "objects". An object identifies all the data associated with the application domain of each entity being analyzed. In an SM (one per object identified in the IM), different states of an object instance are shown. When an object instance enters a state, it performs certain Actions. As pan of these actions, it generates Events. Events generated in the state model of an object may cause state transitions in another object or cause transitions in its own state model. Data may be associated with an event. The OCM shows only those events generated in an object that cause transitions in another object's state model. An Events dictionary lists all the events in the different state models. A PM is used to provide details of data flow with an Action Process (combined list of actions) in each State of each Object.

FIG. 1 is a representation of a part of an Information Model (IM) for a broadband network. In FIG. 1, an exemplary list of identified objects is provided in the first column on the left hand side. Relationships between objects can be one-to-one, one-to-many, or many-to-many. Associative objects and relational attributes are used to represent many-to-many relationships. In FIG. 1, the call-connection-mapping, the VCI-Translation-Table-entry and the user-call-interaction are associative objects.

In the middle column of the table of FIG. 1 are listed the identifying attributes of the objects. All of these attributes are either self-explanatory or are described in further detail below.

Listed in the first column on the right hand side are the non-identifying attributes of the objects. Those attributes identify particular characteristics associated with an object. For example, non-identifying attributes of a call object include Server Identifiers and User Identifiers to particularly point-out the servers and users involved in the call. Similarly, non-identifying attributes of a switch include Capacity of the Switch, Number of Priorities Offered, Maximum Switching Rates.

Figure 2:
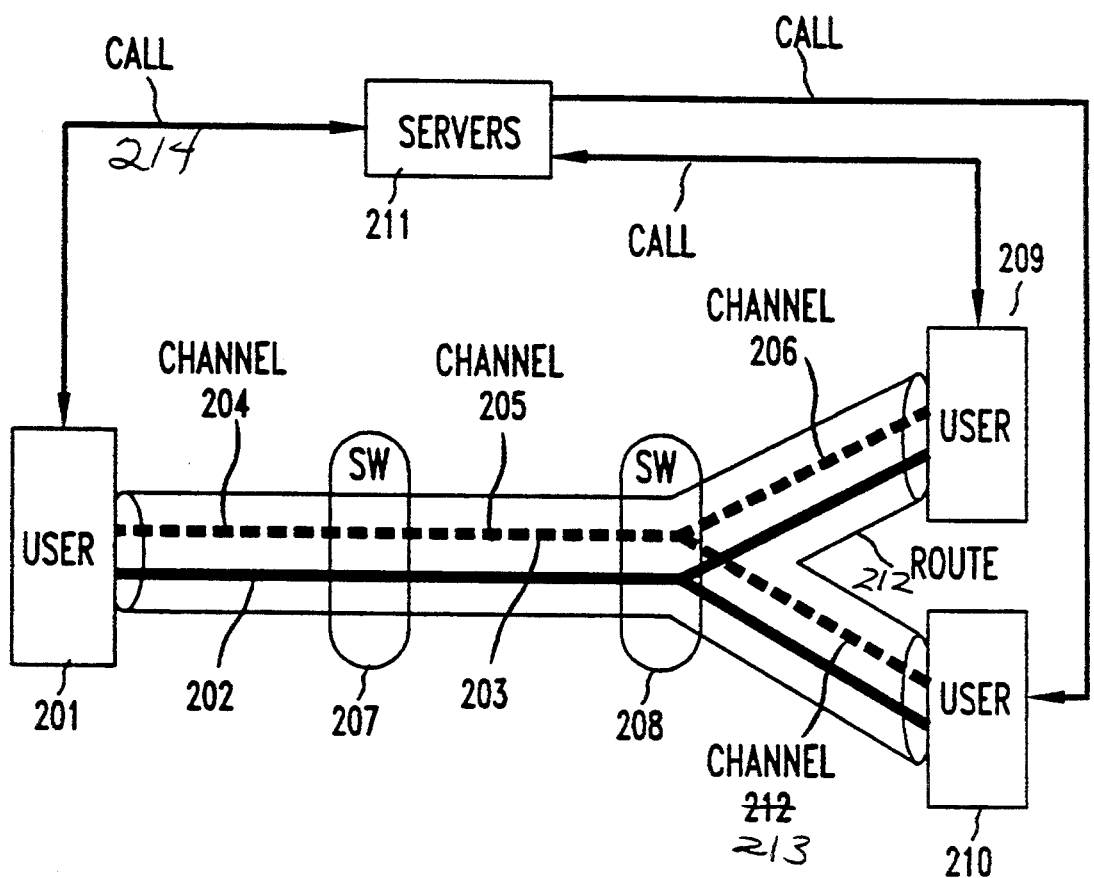
FIG. 2 depicts instances of the call, channel, connection and route objects for an illustrative multipoint, multiconnection call in a B-ISDN networking environment.

FIG. 2 depicts the instances of the call, channel, connection and route objects for an illustrative multipoint, multiconnection call in a B-ISDN simplified networking environment. The objects shown in FIG. 2 are a) the users 201, 209 and 210; b) the connections 202 and 203; c) the switches 207 and 208; d) the server 211, the route 212, the channels 204, 205, 206 and the call 214. The characteristics, attributes, and the operations and functions associated with each object are discussed below.

In FIG. 2, a user 201 is shown connected to a switch 207 via a channel 204. The user 201 may be, for example, a digital Communications Premises Equipment (CPE), such as a PBX, a data terminal or data communications equipment, arranged to transmit and receive data at fixed or variable rate. Connections 202 and 203 represent communications paths between users 201, 209 and 210 through switches 207 and 208. In B-ISDN terminology, a connection, such as connection 202 or 203 is called a "Virtual Channel Connection" (VCC). Although connections 202 and 203 are shown as multipoint communications paths terminated on users 209 and 210, connections may be configured as point-to-point communications paths terminated on users as well as servers. An important characteristic of connections 202 and 203 is that they extend between points (such as, users 201, 209 and 210) where the ATM adaptation layer protocol (AAL) which manages end-to-end communications, is terminated. Connections 202 and 203 are in effect, a "slice" of the route 212, utilizing a portion of the resources of that route over which they run. For communications in the broadband network of FIG. 2, connections 202 and 203 are referenced by a) their unique connection identifier called a Virtual Channel Connection Identifier (VCCI) and b) the end entity identifiers (users or servers). Of particular importance are the attributes of connections 202 and 203. These attributes include performance metrics, adaptation layer parameters, directionality, symmetry and the identifiers of switches in these connections.

Functions associated with the control of connections 202 and 203 comprise a) connection establishment including end-to-end Quality-of-Service (QOS) computation, b) connection release, c) connection modification, and d) connection status and configuration information management. In the broadband networking environment of FIG. 2, since a single connection may be active on many calls, or a single call (such as call 214) may have many active connections (such as, connections 202 and 203), the relationship between the objects are many-many. For this reason, an associative object called the call-connection mapping is defined to map connections into calls.

Included among the physical objects of FIG. 2 are switches 207 and 208. Those switches are preferably Asynchronous Transfer Mode (ATM) switches that are arranged to format, multiplex, cross-connect and switch information in 53-byte packets called "cells" to support voice, data and video services (in an integrated fashion or individually) at a wide variety of interface speeds. Because of the variety of services supported by a broadband network in general and switches 207 and 208, in particular, a call, such as call 214 needs to be controlled. Call control functions include a) service coordination to identify service requests and reconcile conflicts (when present) among those services, b) end-to-end negotiation to match (for the call) requested services and resources to available services and resources in the network, c) management of information regarding status, configuration, ownership and permissions information for calls, d) interaction with connection servers e) user-to-user, user-to-server negotiations and f) the establishment and release of calls.

Also shown in FIG. 2 is a route 212 which consists of a network communications path that connects users 201, 209, 210 through switches 207 and 208. Although in FIG. 2, route 212 is depicted as a multipoint path, it would be appreciated that a route may be point-to-point or multipoint. Associated with route 212 are particular attributes, such as performance metrics, bandwidth, directionality, symmetry and identifiers of switches in the route. Route control deals primarily with the availability of routes and resources on each route.

In FIG. 2, a channel 204 is a logical link between the user 201 and the switch 207. Similarly, the channel 205 connects ATM switches 207 and 208, while the channels 206 and 214 provide links between ATM switch 208 and users 209 and 210, respectively. In the broadband networking environment of FIG. 2, a channel is referenced by the Virtual Path Connection Identifier (VPCI), and end entity identifiers and port numbers. Associated with channels 204, 205, 206 and 213 are ATM layer and performance attributes. Functions related to channel control include a) management of resources such as, VPCIs and VCIs, on a link by link basis, and b) entries and updates of VCI translation table data that are needed to interconnect channels that are part of a connection.

Figure 3:
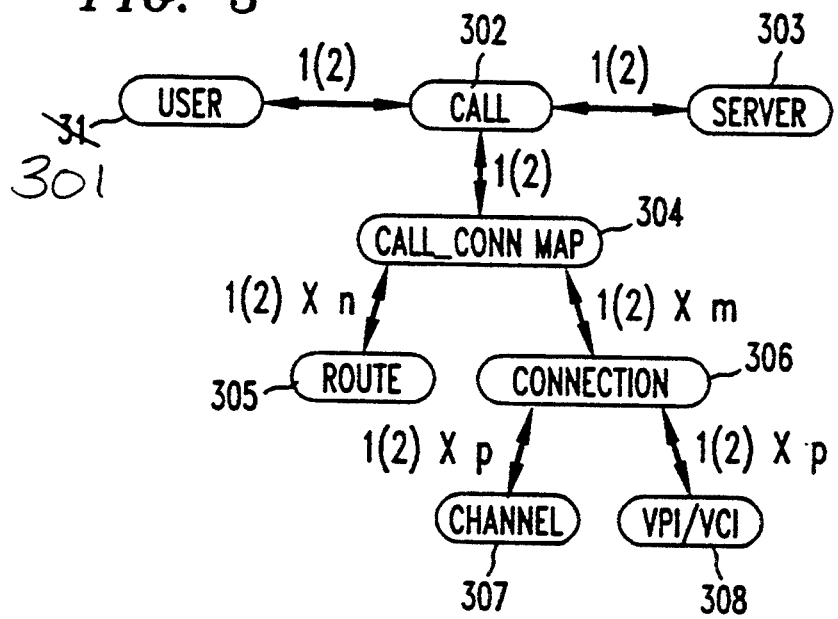
FIG. 3 shows some of the objects of FIG. 2 and the number of cross-object events needed between these objects to perform certain traditional call processing functions in a broadband communications network to establish communications between users.

FIG. 3 shows some of the objects of FIG. 2 and the number of cross-object events needed between these objects to perform certain traditional call processing functions in a broadband communications network to establish communications between users. The objects in FIG. 3 communicate in a manner that is consistent with the OCM. In FIG. 3, a labeling scheme has been adopted to identify the number of transactions and cross-object events required for communications between users and servers. The digit in parentheses indicates the number of cross-object events needed to carry out communication between two objects, while the digit to the left of the one in parentheses points out the number of transactions needed for the same communication. For example, one transaction and two cross-object events are needed for communications between the user object 301 and the call server object 302. As shown in FIG. 3, a similar number of transactions is needed for communications between the call object 302 and the server object 303.

Because of the potential high number of routes, connections and channels that may be needed to set up and maintain a call in a broadband communications network, the number of transactions and events between objects needed for that call may be significant. For example, the number of transactions and cross-object events needed for communications between the route object and the call-connection-mapping object is a function of n, where n represents the number of routes active in the call. Similarly, the number of transactions and cross-object events needed for communications between the route object and the call-connection-mapping object is a function of m, where m represents the number of connections. Likewise, communications between the connection object and the channel objects require p transactions and 2p cross-object events, where p represents the number of channels.

Figure 4:
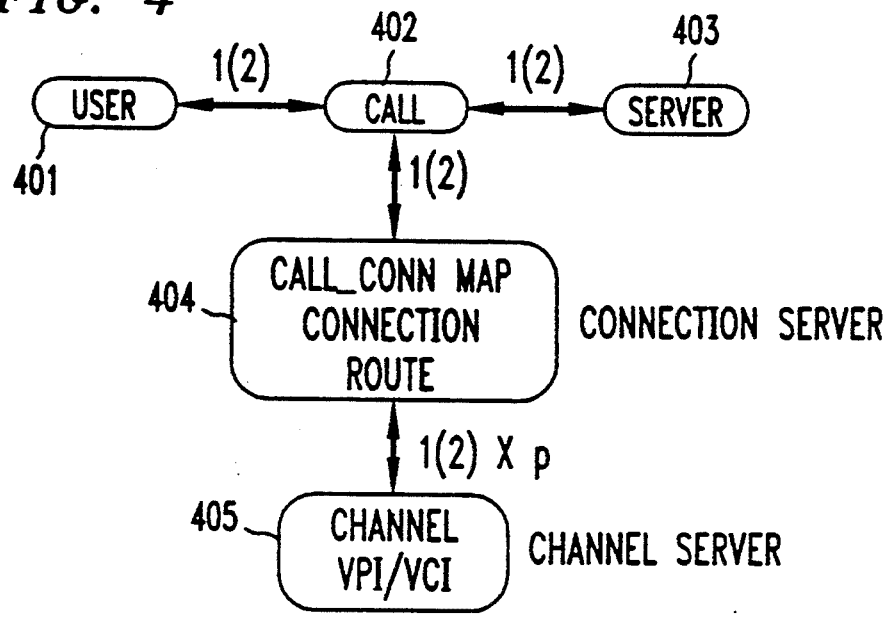
FIG. 4 shows an illustrative arrangement of servers in which multiple objects are grouped together in certain servers to limit the number of signaling communications messages.

FIG. 4 shows an illustrative arrangement of servers in which multiple objects are grouped together in certain servers to limit the the number of signaling communications messages. FIG. 4 shows a client represented by user 401 connected to a call server 402. The latter is also connected to a communications services server 403 and to a connection server 404 which is itself linked to a channel server 405. FIG. 4 is derived from the IM and OCM models of the Object-Oriented Analysis methodology. More specifically, objects that use a significant number of transactions and cross-object events to perform an operation associated with a call processing function, are simply placed in the same server. For example, the connection server 404 manages the call-connection-mapping object 304, the connection object 306 and the route object 305 of FIG. 3. Similarly, the channel server 405 manages the channel object 307 and the VPI/NCI object 308 of FIG. 3. By grouping these objects in the same server, the number of transactions and signaling messages needed for communications between the servers is greatly reduced. For example, only one transaction and two signaling messages are needed for communications between the servers of FIG. 4 or between the user/client 401 and the call server 402.

Figure 5:
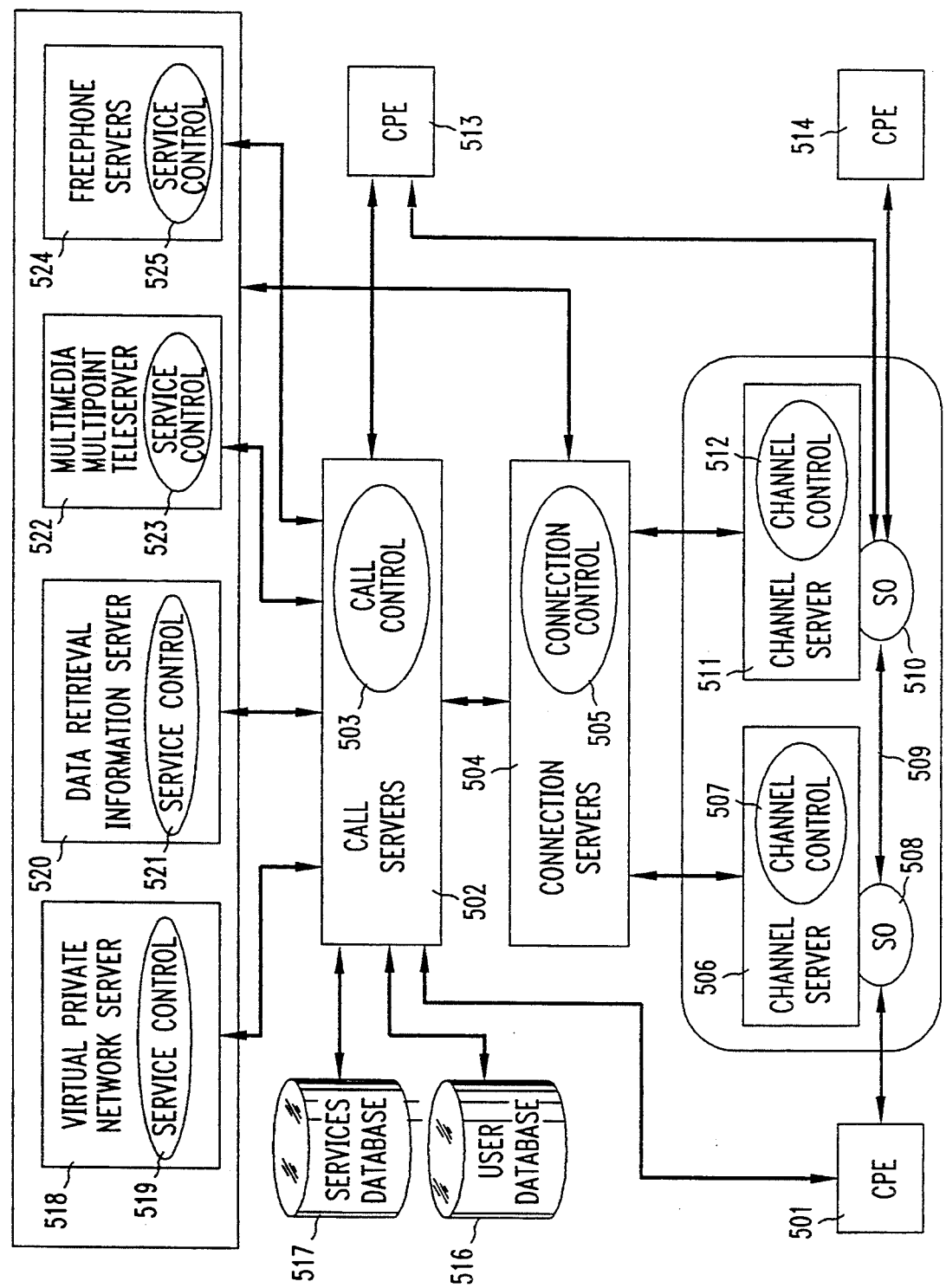
FIG. 5 shows a block diagram of a distributed processing architecture for a broadband and narrowband communications network.

FIG. 5 shows a representation of a distributed processing architecture for a broadband and narrowband communications network. The distributed processing architecture of FIG. 5 is based on the client/server distribution structure of FIG. 4. In FIG. 5, user/clients and their instances are represented by CPE 501, 513 and 514. The servers in the distributed architecture of FIG. 5 include channel servers 506 and 511, connection server 504, call server 502 and service-specific servers 519, 521, 523 and 525, which are representative of the types of communications services that can be provided in a broadband communications network. It is to be understood that other types of service-specific servers could also be included in the distributed architecture. Connected to the call server 502 are a users database 516 and a service database 517, which store subscriber profile and service-specific information that may be shared by the service-specific servers. Also shown in FIG. 5 are Switching Offices (SO) 508 and 510. The latter are Asynchronous Transfer Mode (ATM) switches arranged to cross-connect, switch and multiplex integrated, voice, data and video traffic.

In FIG. 5, each server executes an application process or call processing subfunction that is shown within an ellipse in that server. For example, since the call object is placed in the call server 502, it follows that the associated call control application process 503 should be located in the same server. Each server in the architecture is designed to operate in a modular fashion, i.e., independently of the operations of the other servers. The call server 502 has knowledge of the operations of the service-specific servers 518, 520, 522 and 524 and connection server 504 only to the extent necessary for communications with those servers and to to manage feature interaction within a call. The servers of FIG. 5 are shown as physically separated from each other. It would be appreciated that those servers can be logically partitioned without being physically separated from one another.

Channel servers 507 and 512 are associated with switches 508 and 510. Those servers maintain all instances of the channel object associated with the ports of their associated switch. They also maintain instances of the VCI Translation Table Entry object for connections that traverse the switch (508 or 510) with which the particular channel object (506 or 512) is associated.

The connection server 504 provides bearer services with capabilities to add, drop or modify a connection through switches 504 and 510. In addition, the connection server 504 provides common/diverse routing of connections and end-to-end Quality-of-Service (QOS) computation for connections. Connection servers 504 also maintain connection, state and configuration information.

At the heart of the distributed architecture of FIG. 5 is call server 502, which is arranged to provide the functions such as: facilitate user-to-user and user-to-network negotiation of options and check for user/server status and compatibility; provide service invocation and coordination functions; recognize any need for special resources (e.g. converters); maintain call state, configuration information; and manage call reference values and user account information; interact with connection servers; and establish, modify and release calls. To provide these functions, call server 502 is physically linked to the CPE 501, 513 and 514 and the service-specific servers 519, 521, 523 and 525. In addition, call server 502 has also a physical link to connection server 504 for connection and route control functions.

To illustrate how call processing functions are performed for the establishment of a two-party call, let us take the example of a user who initiates such a call and desires certain services with certain attributes to be provided in that call. The request message and the underlying parameters for the desired services associated with that call are sent by the user as a service invocation to the call server 502. The latter processes the request and forwards the associated parameters to the appropriate service-specific servers to invoke operations as necessary in those service-specific servers. The latter servers may interact with like servers (even in other networks) to perform the operations indicated by the call server 502. At the completion of these operations, the service-specific servers report the results of their operation(s) to the call server 502. The latter performs user-to-user and user-to-server negotiations based on the results of the operations performed by the service-specific servers. Subsequently, the call server 502 invokes the services of connection server 504 to request that connections with certain performance and routing characteristics be established. As part of its route control functions, connection server 504 may retrieve relevant information from other connection servers or may query channel servers 506 and 511 for appropriate information. When the connection server 504 has selected the routes for the connections, it invokes the services of the channel servers 506 and 511 to establish the virtual channel links. At the end of their operations, the channel servers 506 and 511 report the result of these operations. If the channel operations were successful and the requested channels have been allocated, the connection server 504 returns a positive result message to the call server 502 indicating that the requested connections have been established. At that time, the call server 502 returns a positive result message to the users involved in the call indicating that the call has been established.

While the operations indicated in the example above are described sequentially for clarity purposes, it would be appreciated by persons skilled in the art that some of these operations may be performed concurrently with other operations.

Figure 6:
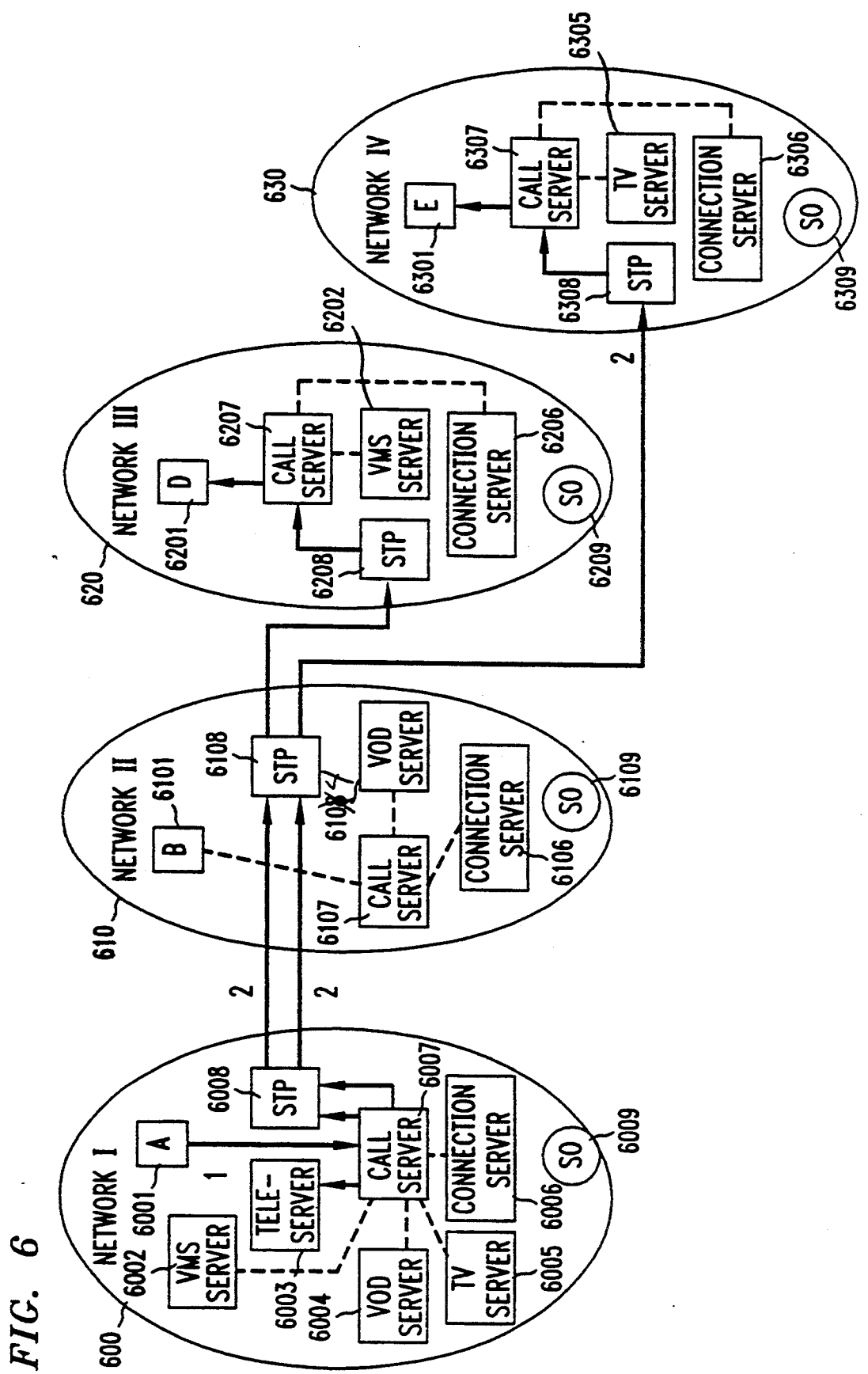
FIG. 6 is an illustrative block diagram of a multiple network configuration for the distributed architecture of FIG. 5.

FIG. 6 is a block diagram of a multiple network configuration for the distributed architecture of FIG. 5. Shown in FIG. 6 are four networks 600, 610, 620 and 630 designed in accordance with the client/server distributed architecture depicted in FIG. 5. Each of these networks comprises a call server (6007 for Network I, 6107 for Network II, 6207 for Network III and 6307 for Network IV) that is connected to the other servers in each network. As described above, one of the functions of these call servers is to forward parameters associated with a requested service to the appropriate service-specific servers and to request establishment of connections and channels from their respective attached connections servers.

Also connected to call servers 6007, 6107, 6207 and 6307 are Signal Transfer Points (STP) 6008, 6108, 6208 and 6308, respectively. Those STPs act as gateways for signaling communications messages to be exchanged among the networks 600, 610, 620 and 630. Thus, when one of these networks wants to request a particular service from another network as pan of the call setup process, service request signaling messages are forwarded from the call server of the requesting network (via the requesting network STP) to the call server of the destination network (via its STP). The call server of the destination network invokes the requested service from the appropriate the service-specific server in that network. For example, in a video on-demand application, if user A wants to watch a particular movie that is not available on TV server 6005, call server 6007, upon being so notified, would launch a query that is transmitted via STPs 6108 and 6308 to call server 6307 to inquire as to the availability of that movie in TV server 6305. If the movie is available in TV server 6305, user-server negotiation is managed by call servers 6007 and 6307. Similarly, a call between user A associated with network 600, and user E associated with network 630 requires exchange of signaling messages via STPs 6008, 6108 and 6308 for a) service invocation, b) service coordination between these networks, and c) user-user and user-server negotiations.

We claim:

1. A communications network for delivery of broadband and narrowband communications services comprising:
a plurality of communications servers, each one of which is arranged for perforating in a modular fashion no more than one of the switching and signaling functions which are a) selected from a group which includes channel control, call control, and connection control, and b) comprised of related switching and signaling applications processes in order to minimize the number of signaling messages exchanged between said communications servers; and communications means for enabling said exchange of signaling messages between at least two of the communications servers.

2. The invention of claim 1 wherein said server performing said connection control function comprises means for establishing, releasing, and modifying connections within a call, said modifying means including means for computing end-to-end quality-of-service measures.

3. A communications network for delivery of broadband and narrowband communications services comprising:

a plurality of communications servers, each one of which is arranged for performing in a modular fashion no more than one of the switching and signaling functions selected from a group which includes channel control, call control, and connection control;

communications means between at least two of the communications servers to exchange signaling messages; and means for exchanging information between at least one of said communications servers in the communication network and at least one service-specific server which is arranged for a) providing a particular communications service and b) performing a service control function when said communications service is requested by a user.

4. A communications network for delivery of broadband and narrowband communications services comprising:

a plurality of communications servers, each one of which is arranged for performing in a modular fashion no more than one of the switching and signaling functions selected from a group which includes channel control, call control, and connection control;

communications means between at least two of the communications servers to exchange signaling messages;

means for invoking services and coordinating delivery of said invoked services when multiple services are requested in a call;

means for negotiating allocation of resources between two or more users and between at least one user and at least one server;

means responsive to users' requests for recognizing needs for special resources which include protocol converters and multimedia bridges;

means for maintaining call state and configuration information; and means for managing ownership and permissions for said call.

5. A communications network for delivery of broadband and narrowband communications services comprising:

a plurality of communications servers, each one of which is arranged for performing in a modular fashion no more than one of the switching and signaling functions selected from a group which includes channel control, call control, and connection control;

communications means between at least two of the communications servers to exchange signaling messages means for allocating resources on a link by link basis to implement a connection; and means for maintaining Virtual Channel Identifier translation table entries to interconnect channels that are part of said connection.

6. A communications network for delivery of broadband and narrowband communications services comprising:

a plurality of communications servers, each one of which is arranged for performing in a modular fashion no more than one of the switching and signaling functions selected from a group which includes channel control, call control, and connection control; and communications means for exchanging information between at least two of the communications servers; and means for exchanging information between at least one of the communications servers in said communications network and another server from a different network.

7. A method of delivering broadband and narrowband communications services comprising the step of:

performing in a modular fashion in each one of a plurality of communications servers no more than one of the switching and signaling functions which are a) selected from a group which includes channel control, call control and connection control, and b) comprised of related switching and signaling applications processes such that the number of signaling messages exchanged between said communications servers is minimized; and exchanging said signaling messages between at least two of the communication servers.

8. A method of delivering broadband and narrowband communications services comprising the steps of performing in a modular fashion in each one of a plurality of communications servers no more than one of the switching and signaling functions selected from a group which includes channel control, call control and connection control; and exchanging a) signaling messages via communications channels between at least two of the communication servers and b)

information between at least one communication server and at least one service-specific server which provides a particular communications service upon request from a user.

9. A method of delivering broadband and narrowband communications services comprising the steps of performing in a modular fashion in each one of a plurality of communications servers no more than one of the switching and signaling functions selected from a group which includes channel control, call control and connection control; and exchanging signaling messages via communications channels between at least two of the communication servers;

invoking particular communication services in coordinating delivery of said invoked services when multiple services are requested in a call;

negotiating allocation of resources between two or more users and between at least one user and at least one communications server;

in response to particular users' requests, recognizing needs for special resources which include protocol converters and multimedia bridges;

maintaining call state and configuration information; and managing ownership and permission for said call.

10. A method of delivering broadband and narrowband communications services comprising the steps of performing in a modular fashion in each one of a plurality of communications servers no more than one of the switching and signaling functions selected from a group which includes channel control, call control and connection control; and exchanging signaling messages via communications channels between at least two of the communication servers;

allocating resources on a link-by-link basis to implement a connection; and maintaining virtual channel identifier translation table entries which are part of said connection.

11. A method of delivering broadband and narrowband communications services comprising the steps of performing in a modular fashion in each one of a plurality of communications servers no more than one of the switching and signaling functions selected from a group which includes channel control, call control and connection control; and exchanging signaling messages via communications channels between at least two of the communication servers; and establishing, releasing, and modifying connections within a call, said modifying step including end-to-end computation of quality of service measures.

12. A method of delivering communications services in a broadband and narrowband communications network comprising the steps of:

receiving in a first communications server a user's request for service signals which include particular parameters associated with said request, said parameters comprising origination and destination information;

forwarding to a service-specific server at least part of said signals along with instructions specifying particular operations to be performed in said service-specific server;

determining in said first communications server resources to be allocated for delivery of said service based on the results of the operations performed by the service-specific server;

communicating with a) a second communications server to request at least one connection set up with certain performance and routing characteristics, and b) a third communications server to request at least one virtual channel link set up for delivery of said service, said second and third communications servers being functionally separate from said first communications server;

receiving in said first communications server messages indicative of the results of the connection and channel link operations; and generating messages signaling said user that the requested service is available and ready to be delivered.

* * * * *